US012137026B1

(12) United States Patent
Cathrow et al.

(10) Patent No.: US 12,137,026 B1
(45) Date of Patent: *Nov. 5, 2024

(54) IDENTIFYING TRUSTED CONFIGURATION INFORMATION TO PERFORM SERVICE DISCOVERY

(71) Applicant: VeriSign, Inc., Reston, VA (US)

(72) Inventors: Andrew Cathrow, Ashburn, VA (US); Andrew Fregly, Herndon, VA (US); Stephen D. James, South Riding, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,296

(22) Filed: Nov. 29, 2021

Related U.S. Application Data

(63) Continuation of application No. 15/148,990, filed on May 6, 2016, now Pat. No. 11,190,397.

(60) Provisional application No. 62/159,779, filed on May 11, 2015.

(51) Int. Cl.
| | |
|---|---|
| H04L 61/4511 | (2022.01) |
| H04L 9/40 | (2022.01) |
| H04L 41/0806 | (2022.01) |
| H04L 61/4541 | (2022.01) |
| H04L 67/51 | (2022.01) |

(52) U.S. Cl.
CPC ...... *H04L 41/0806* (2013.01); *H04L 61/4511* (2022.05); *H04L 61/4541* (2022.05); *H04L 63/08* (2013.01); *H04L 63/123* (2013.01); *H04L 63/166* (2013.01); *H04L 67/51* (2022.05); *H04L 63/062* (2013.01)

(58) Field of Classification Search
CPC . H04L 61/1511; H04L 61/1541; H04L 63/08; H04L 63/123; H04L 63/166; H04L 63/16; H04L 41/0806
See application file for complete search history.

(56) References Cited

U.S. PATENT DOCUMENTS

| | | | |
|---|---|---|---|
| 8,990,392 B1 | 3/2015 | Stamos | |
| 10,033,699 B2 | 7/2018 | Sullivan et al. | |
| 10,091,278 B1 * | 10/2018 | Garlapati | H04W 4/70 |

(Continued)

*Primary Examiner* — Dhairya A Patel
(74) *Attorney, Agent, or Firm* — McCarter & English, LLP; Michael A. Sartori

(57) ABSTRACT

In one embodiment, a delegation engine automatically provisions a device connected to a network to securely identify and interact with external services. As a device boots in a deployment environment, the delegation engine generates a search domain name based on a manufacturer-supplied domain name and a domain name associated with the deployment environment. The delegation engine then searches a Domain Name System (DNS) to retrieve a delegation record stored at the search domain name. After verifying a manufacturer signature associated with the delegation record, the delegation engine configures the device based on service discovery information included in the delegation record. Because the delegation engine automates the provisioning process, the time required to provision devices is acceptable irrespective of the number of the devices. Further, because the delegation engine verifies the delegation record, the delegation engine does not expose the device to security risks during the provisioning process.

12 Claims, 4 Drawing Sheets

(56) References Cited

U.S. PATENT DOCUMENTS

| | | |
|---|---|---|
| 10,574,678 B2 | 2/2020 | Comay |
| 2003/0158792 A1 | 8/2003 | Perkowski |
| 2004/0260620 A1 | 12/2004 | Dunn et al. |
| 2008/0089511 A1* | 4/2008 | Elliott .................. H04M 19/041 |
| | | 379/399.01 |
| 2008/0102821 A1 | 5/2008 | Jalon |
| 2009/0198997 A1 | 8/2009 | Yeap et al. |
| 2010/0036915 A1 | 2/2010 | Kim et al. |
| 2012/0036244 A1* | 2/2012 | Ramachandra ..... H04L 41/0806 |
| | | 709/223 |
| 2012/0124369 A1 | 5/2012 | Amenedo et al. |
| 2013/0275272 A1 | 10/2013 | Begin et al. |
| 2013/0311832 A1 | 11/2013 | Lad et al. |
| 2014/0013105 A1 | 1/2014 | Niemeyer |
| 2014/0223461 A1* | 8/2014 | Hatambeiki ....... H04N 21/4415 |
| | | 725/10 |
| 2014/0244998 A1* | 8/2014 | Amenedo ............. H04L 63/126 |
| | | 713/156 |
| 2014/0270200 A1* | 9/2014 | Usher ..................... G10L 25/78 |
| | | 381/74 |
| 2014/0282739 A1* | 9/2014 | Augustine .......... H04N 21/4312 |
| | | 725/52 |
| 2015/0095648 A1 | 4/2015 | Nix |
| 2015/0341446 A1* | 11/2015 | Nguyen ................. H04L 67/12 |
| | | 709/223 |
| 2016/0197898 A1* | 7/2016 | Hozza ................ H04L 63/1466 |
| | | 713/168 |
| 2016/0205097 A1* | 7/2016 | Yacoub ............... H04L 61/4511 |
| | | 726/6 |
| 2016/0205106 A1 | 7/2016 | Yacoub et al. |
| 2017/0180380 A1* | 6/2017 | Bagasra ............... H04L 63/101 |
| 2018/0176228 A1* | 6/2018 | He .......................... H04L 67/12 |
| 2023/0007556 A1* | 1/2023 | Qiao ..................... H04W 36/32 |
| 2023/0016774 A1* | 1/2023 | Link, II ................... G01S 11/06 |

* cited by examiner

IDENTIFYING TRUSTED CONFIGURATION INFORMATION TO PERFORM SERVICE DISCOVERY

CROSS-REFERENCE TO RELATED APPLICATIONS

This application is a continuation of the U.S. patent application having Ser. No. 15/148,990 filed May 6, 2016, which claims benefit of the U.S. Provisional Patent Application having Ser. No. 62/159,779 filed May 11, 2015. The subject matter of these related applications is hereby incorporated herein by reference.

BACKGROUND OF THE INVENTION

Field of the Invention

Embodiments of the present invention relate generally to computer networks and secure electronic communications and, more specifically, to identifying trusted configuration information to perform service discovery.

Description of the Related Art

The number of devices that are connected through networks has grown significantly over the past two decades, and that number is expected to steadily increase in the future. For example, with the advent of the "Internet of Things" (IoT), where any physical device with an Internet Protocol (IP) address can connect to the Internet, the number of Internet-connected devices is anticipated to increase by one to two orders of magnitude in the next decade. In addition to computer-based physical devices such as laptop and tablets, the notion of an "IoT device" is expected to expand to include buildings, vehicles, wearable technologies, traffic lights, and parking meters, to name a few.

As part of deploying a typical IoT device onto a network, such as the Internet, the IoT device is "provisioned" with service discovery configuration information that enables the IoT device to perform "service discovery." As referred to herein, service discovery is the process by which an IoT device identifies and interacts with one or more external services that support essential network functions, such as communications. For example, an IoT device can be provisioned with service discovery configuration information that enables the IoT device to interact with a Message Queuing Telemetry Transport (MQTT) service. The MQTT service is a machine-to-machine IoT messaging protocol that is used for communication by devices, such as mobile applications and home automation sensors, where bandwidth and power are significantly limited.

The service discovery configuration information enables the IoT device to identify external service providers based on any number of service discovery techniques. For example, to support a hard-coded service discovery technique, the service discovery configuration information could include a list of service providers. By contrast, to support a service discovery technique that is based on a Domain Name System service discovery (DNS-SD) standard, the service discovery configuration information could include a trusted domain name. DNS-SD enables the IoT device to automatically determine service providers on networks based on service records and pointer records for the services that are stored in the DNS under the trusted domain name.

To ensure the integrity of the service discovery configuration information, the customer often manually provisions the IoT device with the service discovery configuration in a secure environment prior to deploying the IoT device in the final networked environment. The secure environment includes a secure network that has been isolated from potentially malicious entities that could configure the IoT device with erroneous configuration data. Such malicious entities may include other IoT devices, software applications used to monitor and/or control the IoT devices, IoT services, gateways, etc.

To perform such a manual provisioning process, the customer connects the IoT device to the secure network and boots the IoT device to establish an operational state. After booting the IoT device in the secure environment, the customer configures the IoT device based on trusted hard-coded configuration information that allows the IoT device to identify and interact with services in the final networked environment. For example, the customer could store a trusted domain name for service discovery in secure memory included in the IoT device. Subsequently, the customer disconnects the IoT device from the secure network and connects the IoT device to a network included in the final networked environment. The customer then reboots the conventional IoT device to deploy the IoT device onto the Internet in an operational run state. Because the IoT device acquires the service discovery configuration information while the IoT device is connected to the secure environment, the service discovery configuration information is trustworthy and uncorrupted irrespective of any security risks associated with the final networked environment.

While such a manual process ensures that the configuration information is valid and trustworthy, the time, cost, overhead, complexity, and potential for error associated with manually provisioning each IoT device is substantial. Further, manual processes of this nature cannot be scaled effectively to accommodate the anticipated increase in the number of IoT devices going forward. For example, if a customer were to deploy ten thousand IoT devices onto the Internet, then the customer would have to perform the entire manual provisioning process for each of the ten thousand IoT devices. Such an approach would quickly become impractical, if not impossible.

As the foregoing illustrates, what is needed in the art are more effective techniques for provisioning Internet of Things (IoT) devices to perform service discovery.

SUMMARY OF THE INVENTION

One embodiment of the present invention sets forth a computer-implemented method for provisioning a device with configuration information. The method includes generating a search domain name based on a first domain name associated with a manufacturer and stored in the device and a second domain name associated with a deployment environment; searching a Domain Name System (DNS) for a delegation record installed under the search domain name; verifying a manufacturer signature associated with the delegation record; and configuring the device based on service discovery information included in the delegation record to facilitate service discovery operations in the deployment environment.

Further embodiments provide, among other things, a computer-readable medium and a system configured to implement the method set forth above.

One advantage of the disclosed techniques is that automatically provisioning a device with configuration information to facilitate service discovery operations dramatically reduces the time, cost, and overhead required to securely provision devices compared to conventional, primarily manual techniques. Further, unlike such conventional techniques, the disclosed techniques scale effectively to accommodate the anticipated increase in the number of Internet of Things (IoT) devices going forward.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

Internet of Things (IoT) System Overview

Figure 1:
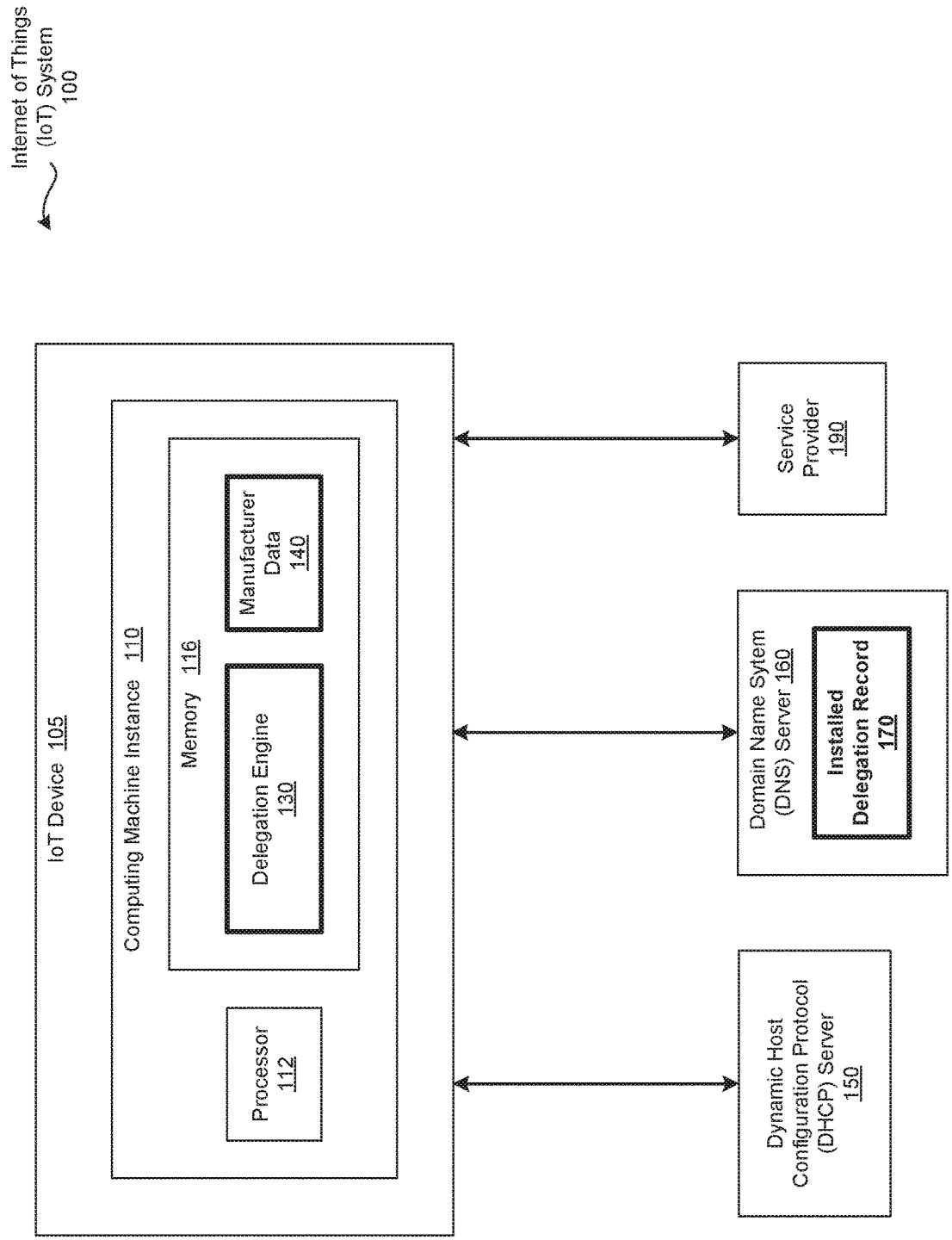
FIG. 1 is a conceptual illustration of an Internet of Things (IoT) system configured to implement one or more aspects of the present invention.

FIG. 1 is a conceptual illustration of a Internet of Things (IoT) system 100 configured to implement one or more aspects of the present invention. As shown, the IoT system 100 includes, without limitation, the Internet of Things (IoT) device 105, a Domain Name System (DNS) server 160, a Dynamic Host Configuration Protocol (DHCP) server 150, and a service provider 190. Although not shown, the IoT system 100 may include any number of other IoT devices 105, any number of other DNS server 160, any number of other DHCP servers 150, and any number of other service providers 190.

Any number of the components included in the IoT system 100 are connected through any number of communication paths that implement any suitable communication protocols in any technically feasible fashion. Further, different communications may use different protocols as known in the art. For example, the IoT device 105 could communicate with other IoT devices 105 connected to the IoT device 105 through a network via a multicast. More specifically, the IoT device 105 could generate a single transmission for distribution to any number of recipients connected through the network. By contrast, the IoT device 105 could communicate with the DNS server 160 connected to the IoT device 105 through the network via a unicast. A unicast is a single transmission directed to a single recipient and transmitted through the network.

The IoT device 105 may be any type of electronic device that is capable of communicating with other electronic devices. For example, the IoT device 105 could comprise a conventional computing device, a smart phone, a wearable technology device, an appliance (e.g. a washer/dryer that utilizes network communications, a smart thermostat system, etc.), a sensor (e.g. a remote monitoring heart monitoring implant, a biochip transponder, an automobile sensor, etc.), a traffic light, a parking meter, etc.

As shown, the IoT device 105 includes, without limitation, a computing machine instance 110. The computing machine instance 110 includes, without limitation, a processor 112 and a memory 116. In operation, the processor 112 controls and coordinates operations of other components included in the computing machine instance 110. The processor 112 may be any instruction execution system, apparatus, or device capable of executing instructions. For example, the processor 112 could comprise a central processing unit (CPU), a digital signal processor (DSP), a controller, a microcontroller, a state machine, or any combination thereof.

The memory 116 stores content, such as software applications and data, for use by the processor 112 of the computing machine instance 110. The memory 116 may be any type of non-volatile memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In alternate embodiments, the computing machine instance 110 may include any number of types of processors 112 and any number and types of memories 116 in any combination. The processor 112 and the memory 116 may be implemented in any technically feasible fashion. For example, and without limitation, in various embodiments, the processor 112 and/or the memory 116 may be implemented as a stand-alone chip or as part of a more comprehensive solution that is implemented as an application-specific integrated circuit (ASIC) or a system-on-a-chip (SoC). In some embodiments, the IoT device 105 may interact with a cloud (e.g., encapsulated shared resources, software, data, etc.) to perform operations associated with the IoT device 105. In such embodiments, the IoT device 105 may not include the computing machine instance 110 and the delegation engine 130 may be implemented in the cloud.

The IoT device 105 includes the necessary hardware and software to communicate with the DNS server 160, the DHCP server 150, the service provider 190, and other IoT devices 105 included in the IoT system 100 using various protocols. In some embodiments, such protocols may include publish-subscribe protocols, i.e., Message Queue Telemetry Transport (MQTT), and Domain Name System (DNS) processes and services. In alternate embodiments, each of the IoT devices 105 may be indirectly connected to the DNS server 160, the DHCP server 150, and/or the service provider 190 through any number of intermediaries.

In such embodiments, the hardware and/or software included in the IoT device 105 may be modified to enable indirect communications with the DNS server 160, the DHCP server 150, and/or the service provider 190.

In general, to enable the IoT device 105 to identify and interact with external services provided by the service providers 190, the IoT device 105 is provisioned with service discovery configuration information. After such provisioning, the IoT device performs "service discovery" based on the service discovery configuration information to identify the service provider 190 associated with a service. As referred to herein, service discovery is the process by which an IoT device identifies and interacts with one or more external services, such as communications, command and control, logging, or monitoring services.

For example, in some embodiments, the IoT device 105 may be provisioned with service discovery configuration information that enables the IoT device to identify and interact with the service provider 190 associated with a Message Queue Telemetry Transport (MQTT) service. The MQTT service is a machine-to-machine IoT messaging protocol that is used for communication by some IoT devices 105 to minimize bandwidth and power usage.

The service discovery configuration information allows the IoT device 105 to identify external service providers based on any number of service discovery techniques. For example, in some embodiments, the IoT device 105 may implement a hard-coded service discovery technique. In such embodiments, the service discovery configuration information may include a list of service providers. In other embodiments, the IoT device 105 may implement a service discovery technique that is based on a Domain Name System service discovery (DNS-SD) standard. As persons skilled in the art will recognize, DNS-SD enables the IoT device to automatically determine service providers on networks based on service records and pointer records for the services that are stored in the DNS under the trusted domain name. Accordingly, in such embodiments, the service discovery configuration information may include a trusted domain name.

Oftentimes, to provision a conventional IoT device for deployment in the IoT system 100, a customer manually configures the conventional IoT device with trustworthy discovery configuration information in a secure, isolated, environment. More specifically, the customer connects the conventional IoT device to a secure network included in the secure environment and boots the conventional IoT device to establish an operational state. The customer then manually configures the conventional IoT device. Subsequently, to deploy the conventional IoT device in the IoT system 100, the customer disconnects the conventional IoT device from the secure network, connects the conventional IoT device to a network included in the IoT system 100, and reboots the conventional IoT device. Because such a manually-based provisioning process does not expose the conventional IoT device to external entities and configuration data, the provisioning process does not jeopardize the security of the conventional IoT device. Such external entities may include other IoT devices 105, software applications used to monitor and/or control the IoT devices 105, IoT services, gateways, and so forth.

However, the manually-based conventional provisioning process described above is time consuming, costly, complex, error-prone and requires significant overhead. Further, because the entire provisioning process is repeated for each conventional IoT device, manual processes of this nature cannot be scaled effectively to accommodate the anticipated increase in the number of IoT devices going forward. For example, if a customer were to deploy ten thousand conventional IoT devices onto the Internet, then the customer would have to perform the entire manual provisioning process for each of the ten thousand IoT devices. Such an approach would quickly become impractical, if not impossible. For this reason, the memory 116 includes a delegation engine 130 that configures the processor 112 to automatically provision the IoT device 105 to perform service discovery.

As a general matter, the IoT system 100 includes, without limitation, entities and software that provide underlying technologies to support essential Internet functions, such as communications and security. The IoT device 105 is configured to interact with other entities within the IoT system 100 based on protocols and standards that provide a framework for such essential Internet functions. In particular, the delegation engine 130 leverages the Domain Name System (DNS) protocol, the Domain Name System Security Extension (DNSSEC), and the Dynamic Host Configuration Protocol (DHCP) to automatically provision the IoT device 105 to perform service discovery. Further, the IoT device 105 leverages the DNS service discovery (DSN-SD) standard to automatically perform service discovery.

The DNS is the part of the Internet infrastructure that translates human-readable domain names into the Internet Protocol (IP) numbers needed to establish TCP/IP (Transmission Control Protocol/Internet Protocol) communication over the Internet. The DNS allows users to refer to web sites, and other resources, using intuitive domain names, such as "www.example.com", rather than the numeric IP addresses associated with a website, e.g., 192.0.2.78, and assigned to devices on the Internet. Each domain name can be made up of a series of character strings (e.g., labels) separated by dots. The order of the labels represents a relationship between domain names within the DNS hierarchy. The right-most label in a domain name is known as the top-level domain ("TLD"). Examples of well-known TLDs are "com"; "net"; "org"; and the like. Each TLD supports second-level domains, listed immediately to the left of the TLD, e.g., the "example" level in "www.example.com". Domains can nest within the hierarchy for many levels.

In general, the DNS provides mechanisms for associating a variety of information with domain names based on resource records. For example, in addition to storing address records that map domain names to IP addresses, the DNS stores service records (SRV) that identify services. Further, the DNS stores text records (TXT) that include arbitrary text and enable the DNS to serve as a general purpose database. A hierarchy of the DNS servers 160 included in the IoT system 100 maintain the resource records in large databases. Typically, each of the DNS servers 160 is responsible for a portion of the hierarchy.

As a general matter, a "DNS installation request" is a request to store a particular resource request in the DNS under a particular domain name. In operation, upon receiving a DNS installation request from an authorized requesting entity, the DNS server 160 installs (i.e., stores) the resource record associated with the DNS installation request in the DNS under the domain name associated with the DNS installation request. In a complementary fashion, upon receiving a DNS query from a requesting entity, the DNS server 160 searches the DNS based on a domain name associated with the DNS query and, optionally, a resource record type associated with the DNS query. If the DNS server 160 successfully locates one or more resource records that match the DNS query, then the DNS server 160 returns the matching resource record(s) to the requesting entity.

In various embodiments the DNS server 160 may implement any number and type of security mechanisms to ensure the authenticity of DNS installation requests, DNS queries, and/or resource records. For example, in some embodiments, the DNS server 160 may implement DNS Security Extensions (DNSSEC) techniques to authenticate resource records. As part of installing a resource record in the DNS, a DNSSEC signature that is associated with the resource record is generated. The DNSSEC signature is returned along with the resource record to a requesting entity in response to a DNS query. Subsequently, the requesting entity attempts to verify the DNSSEC signature associated with the resource record. If the requesting entity successfully verifies the DNSSEC signature, then the requesting entity uses the information in the resource record. If, however, the requesting entity is unable to verify the DNSSEC signature, then the requesting entity ignores the information in the resource record. The DNSSEC signature can be verified by any entity which processes the resource record including the requesting entity (as above) or intermediate DNS recursive resolvers.

The DHCP is a standardized network protocol in which the DHCP server 150 dynamically distributes configuration parameters associated with a network. Upon connecting to a network, the IoT device 105 receives the network configuration parameters for the IoT device 105 from the DHCP server 150. The network configuration parameters include, without limitation, an IP address assigned to the IoT device 105, an IP address that identifies the DNS server 160, and a domain search path. The domain search path may include any number of domain names. Oftentimes, as part of operating within the IoT system 100, the IoT device 150 searches the DNS for resource records that are stored in the DNS under the domain name(s) included in the domain search path.

The DNS service discovery (DNS-SD) standard provides mechanisms that enable the IoT device 105 to automatically discover external services accessible to the IoT device 105 through one or more networks included in the IoT system 100. In particular, the DNS-SD enables service providers 190 to install service records and pointers to service records in the DNS. To perform service discovery, the IoT device 105 searches for such service records in the DNS based on specific domain names that reduce the scope of the service discovery. Upon successfully retrieving a service record, the IoT device 105 may identify and interact with the service provider 190 associated with the service record.

As part of performing service discovery based on the DNS-SD standard, the IoT device 105 receives service information from external sources. As persons skilled in the art will recognize, obtaining service information from an external source may expose the IoT device 105 to security risks. For example, a rogue service provider could install a rogue service record into the DNS. If the IoT device 105 were to retrieve such a rogue service record and interact with the rogue service provider, then the rogue service provider could breach the security of the IoT device 105. While DNSSEC validates that a resource record is signed by the entity associated with the resource record, DNSSEC does not validate that the signing entity is trustworthy.

To enable the delegation engine 130 to provision the IoT device 105 without relying on potentially malicious information from external sources, the manufacturer of the IoT device 105 and the customer that deploy the IoT device 105 set up a delegation infrastructure prior to the deployment of the IoT device 105. The delegation infrastructure includes manufacturer data 140 and an installed delegation record 170. The manufacturer data 140 includes manufacturer-specific data that enables the delegation engine 130 to locate and verify the installed delegation record 170. The installed delegation record 170 includes trustworthy service provisioning information that is specific to the customer.

As part of the manufacturing process, the manufacturer securely configures the IoT device 105 to include the manufacturer data 140. The manufacturer may configure the IoT device 105 in any technically feasible fashion. For example, in some embodiments, the manufacturer may store the manufacturer data 140 in Flash read-only memory (ROM). In some other embodiments, the manufacturer may include the manufacturer data 140 in boot code. Notably, the manufacturer includes the same manufacturer data 140 in all the IoT devices 105 that the manufacturer provides. Accordingly, the manufacturer data 140 and the process of configuring the IoT devices 105 to include the manufacturer data 410 is customer-agnostic.

Prior to delivering the IoT device 105 to the customer, the manufacturer of the IoT device 105 generates and digitally signs a delegation record. The delegation record may be any resource record type that is supported by the DNS. For example, the delegation record may be a text (TXT) record. In alternate embodiments, the delegation record may be a customized resource record type. The delegation record includes trustworthy configuration information that is typically applicable to all the IoT devices 150 that the manufacturer provides to the customer. For example, in some embodiments, the installed delegation record 180 includes trustworthy domain name(s) that facilitate service discovery.

The manufacturer may generate the manufacturer signature using any technically feasible authentication mechanism. For example, in some embodiments, the IoT system 100 many implement an authentication mechanism that is based on a Public Key Infrastructure (PKI). The PKI uses asymmetric cryptographic key pairs (public/private) associated with a single identity to enable authentication and encryption mechanisms. In such embodiments, the manufacturer generates the manufacturer signature associated with the delegation record based on a private key included in a key pair associated with the manufacturer.

Upon receiving the delegation record, the customer signs the delegation record based on DNSSEC and installs the delegation record into the DNS under an installation domain name that is associated with the customer. As referred to herein, an installed delegation record 170 is the delegation record after the delegation record is signed by both the customer and the manufacturer and stored in the DNS. The customer may generate the installation domain name using any naming convention that is based on the manufacturer data 140 and is consistent with a search algorithms implemented in the delegation engine 130 to locate the installed delegation record 780. Notably, a single installed delegation record 170 enables the delegation engine 130 to securely provision all the IoT devices 105 associated with both the manufacturer and the customer.

Automating Provisioning to Perform Service Discovery

Finally, as part of the boot process, the delegation engine 130 automatically and securely provisions the IoT device 105 to perform service discovery based on the manufacturer data 140, the installed delegation record 180, the DHCP, the DNS protocol, and the DNSSEC. In alternate embodiments, the delegation engine 130 may provision the IoT device 105 to perform service discovery in any technically feasible fashion and based on any type of information included in the installed delegation record 170. For example, in some embodiments, the delegation engine 130 may not implement DNSSEC functionality and/or the IoT device 105 may not perform service discovery based on DNS-SD.

Figure 2:
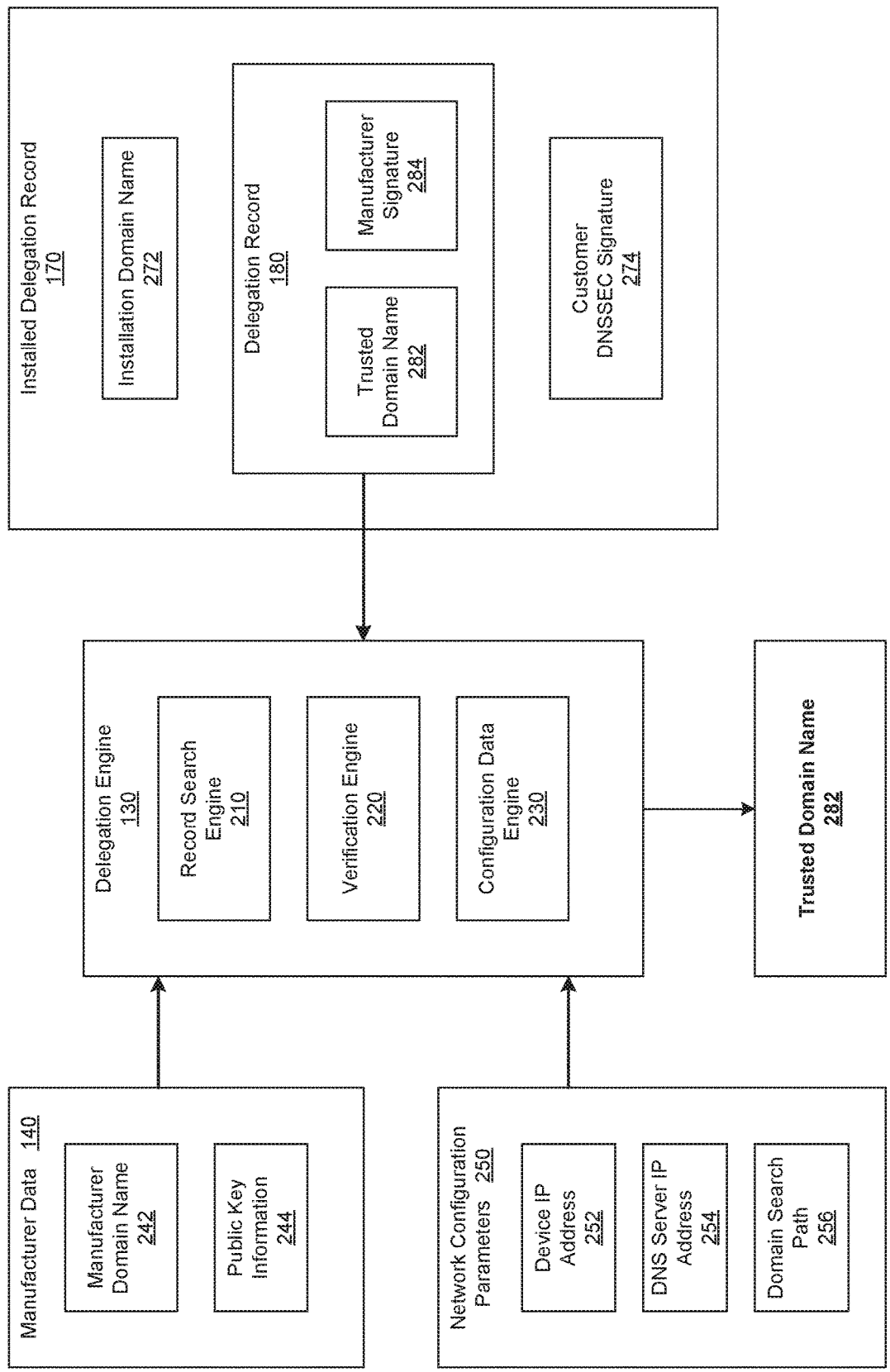
FIG. 2 is a more detailed illustration of how delegation engine of FIG. 1 provisions an Internet of Things (IoT) device with a trusted domain name, according to various embodiments of the present invention.

FIG. 2 is a more detailed illustration of how delegation engine 130 of FIG. 1 provisions the Internet of Things (IoT) device 105 with a trusted domain name 282, according to various embodiments of the present invention. The trusted domain name 282 allows the IoT device 105 to perform service discovery operations. As shown, the delegation engine 130 includes, without limitation, a record search engine 210, a verification engine 220, and a configuration data engine 230. The record search engine 210 searches the DNS for a delegation record 180 that is installed in the DNS under an installation domain name 272 as the installed delegation record 170. The verification engine 220 verifies the authenticity of the delegation record 180. The configuration data engine 230 performs read operations on the delegation record 180 to determine the trustworthy domain name 282 and then configures the IoT device 105 based on the trustworthy domain name 282.

In alternate embodiments, the delegation record 180 may include any type of trustworthy service configuration information instead of or in addition to the trustworthy domain name 282. In such embodiments, the configuration data engine 230 performs read operations on the delegation record 180 to determine the trustworthy service configuration information. The configuration data engine 230 then configures the IoT device 105 to allow the IoT device 105 to perform service discovery operations based on the trustworthy service configuration information.

First, as part of the boot process, the IoT device 105 transmits a DHCP request to the DHCP server 150. The IoT device 105 may identify and communicate with the DHCP server 150 in any technically feasible fashion. In response to the DHCP request, the IoT device 105 receives the network configuration parameters 250 from the DHCP server 150. As shown, the network configuration parameters 250 include, without limitation, a device IP address 252 that is associated with the IoT device 105, a DNS server IP address 254 that identifies the DNS server 160, and a domain search path 256. The DHCP server 150 may assign the device IP address 252 that is associated with the IoT device 105 in any technically feasible fashion. The domain search path 256 may include any number of domain names.

Subsequently, the record search engine 210 searches the DNS for the delegation record 180 based on search domain name(s) (not shown in FIG. 2). The record search engine 210 generates the search domain name(s) based on a manufacturer domain name 242 included the manufacturer data 140 and the domain search path 256. The record search engine 210 may implement any naming convention to generate the search domain names that is consistent with the installation domain name 272. For example, in some embodiments, the customer prefixes one of the domain names included in the domain search path 256 with the manufacturer domain name 242 to generate the installation domain name 272. The customer then installs the delegation record 180 in the DNS under the installation domain name 272. In such embodiments, the record search engine 210 would prefix domain name(s) included in the domain search path 256 with the manufacturer domain name 242 to generate search domain name(s).

After generating a search domain name, the record search engine 210 transmits a DNS record query (not shown in FIG. 2) that includes the search domain name to the DNS server 160 that is identified by the DNS server IP address 254. If the search domain name matches the installation domain name 272 and the DNS server 160 successfully verifies a customer DNSSEC signature 274 that is associated with the installed delegation record 170, then the DNS server 160 transmits the delegation record 180 to the record search engine 210. The record search engine 210 also verifies the DNSSEC signature that is associated with the installed delegation record. As persons skilled in the art will recognize, the DNSSEC signature 274 verifies that the delegation record 180 is associated with the customer. By contrast, if the record search engine 210 is unable to locate the delegation record 180 or if the DNS server 160 or the record search engine 210 is unable to verify the DNSSEC signature 274 associated with the delegation record 180, then the record search engine 210 terminates the secure provisioning process. By terminating the secure provisioning process, the record search engine 210 protects the IoT device 105 from malicious entities such as a rogue DHCP server that may provide an erroneous domain search path 256.

The verification engine 220 then verifies the authenticity of the delegation record 180. More precisely, the verification engine 220 verifies a manufacturer signature 284 associated with the delegation record 180 based on public key information 244 included in the manufacturer data 140 included in the IoT device 105. The public key information 244 enables the verification engine 220 to determine a public key that is included in a cryptographic key pair associated the manufacturer. The key pair also includes the private key used by the manufacturer to generate the manufacturer signature 284. The format and content of the public key information 244 is consistent with the authentication protocols implemented in the IoT device 105.

For example, in some embodiments, the public key information 244 may specify a Transport-Layer Security Authentication (TLSA) record in the DNS that includes or verifies the public key. In some such embodiments, the verification engine 220 may search the DNS for the TLSA record and then perform read operation(s) on the TLSA record to determine the public key. In other embodiments, the public key information 244 may directly specify a public key. The verification engine 220 may implement any technically feasible authentication mechanism to attempt to verify the manufacturer signature 284 based on the public key.

If the verification engine 220 is unable to verify the manufacturer signature 284 associated with the delegation record 180, then the record search engine 210 terminates the secure provisioning process. By terminating the secure provisioning process, the record search engine 210 protects the IoT device 105 from malicious entities such as a rogue DNS server that may store an erroneous delegation record. If, however, the verification engine 220 successfully verifies the manufacturer signature 284 associated with the delegation record 180 and, consequently, the authenticity of the delegation record 180, then the configuration data engine 230 provisions the IoT device 105 based on the delegation record 180.

In general, the configuration data engine 230 may provision the IoT device 105 in any technically feasible fashion. Further, the configuration data engine 230 may provision the IoT device 105 based on any information included in the delegation record 180. For example, in some embodiments, to provision the IoT device 105 to perform service discovery based on the DNS-SD standard, the delegation record 180 includes the trusted domain name 282. In such embodiments, the configuration data engine 230 may perform read operation(s) on the delegation record 180 to determine the trusted domain name 282. The configuration data engine 230 may then store the trusted domain name 282 in the memory 116 included in the IoT device 105. In operation, the IoT device 105 may then restrict a DNS search for service providers to resource records installed in the DNS under the trusted domain name 282.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. In alternate embodiments, the delegation engine 130 may provision the IoT device 105 to perform service discovery in any technically feasible fashion based on any type of information included in the delegation record 180. For example, in some alternate embodiments, the installed delegation record 170 may specify trustworthy service providers 190 instead of trustworthy domain names(s). In such embodiments, the delegation engine 130 would configure the IoT device 105 to interact with the trustworthy service providers 190. Accordingly, the IoT device 105 would not perform service discovery based on the DNS-SD standard. In yet other embodiments, an external entity other than the manufacturer that handles the IoT device 105 prior to deployment may imprint information on the IoT device 105. Such imprinted information may include information relevant to service discovery and may be complemented with additional information. For example, a trusted Department of Defense (DOD) contractor may flash read-only memories (ROMs) on the IoT device 105 and issue the delegation records 170 for installation in the deployment environments.

Figure 3:
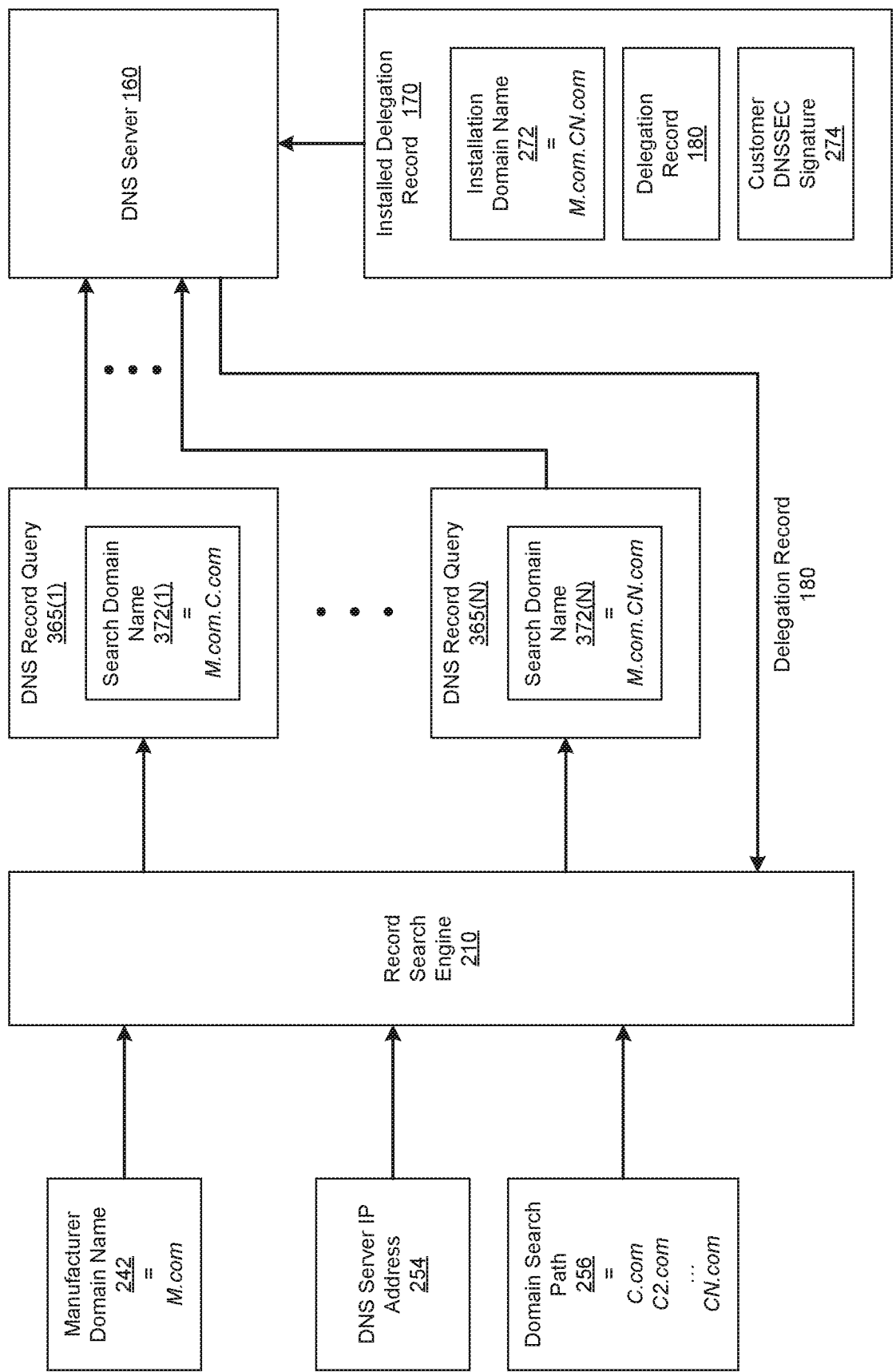
FIG. 3 is a more detailed illustration of how the record search engine of FIG. 2 searches the Domain Name System (DNS) for a delegation record, according to various embodiments of the present invention.

FIG. 3 is a more detailed illustration of how the record search engine 210 of FIG. 2 searches the Domain Name System (DNS) for a delegation record 180, according to various embodiments of the present invention. For explanatory purposes, the manufacturer domain name 242 is depicted as "M.com" and the domain search path 256 is depicted as "C.com, C2.com, . . . , CN.com . . . " The context of FIG. 3 is that the customer prepends a domain name "CN.com" that is included in the domain search path 256 with the manufacturer domain name 242 "M.com," to generate the installation domain name 272 "M.com.CN.com." The customer then signs the delegation record 180 to generate the customer DNSSEC signature 274 and installs the delegation record 180 in the DNS under the installation domain name 272. The resource record type of the delegation record 180 is a text type.

As shown, inputs to the record search engine 210 include, without limitation, the manufacturer domain name 242, the DNS server IP address 254, and the domain search path 256. For explanatory purposes, multiple instances of like objects are denoted with reference numbers identifying the object and parenthetical numbers identifying the instance where needed. First, the record search engine 210 prepends the manufacturer domain name 242 "M.com" to the first domain name "C.com" that is included in the domain search path 256 to generate a search domain name 372(1) "M.com.C.com." The record search engine 210 then transmits a DNS record query 365(1) to the DNS server 160 associated with the DNS server IP address 254. The DNS record query 365(1) causes the DNS server 160 to return any text resource records that are installed under the search domain name 372(1) "M.com.C.com." Because the delegation record 180 is not installed under the search domain name 372(1), the DNS server 160 does not return the delegation record 180.

The record search engine 210 then prepends the manufacturer domain name 242 "M.com" to the second domain name "C2.com" that is included in the domain search path 256 to generate the search domain name 372(1) "M.com.C2.com." Subsequently, the record search engine 210 transmits the DNS record query 365(2) to the DNS server 160. The DNS record query 365(2) causes the DNS server 160 to return any text resource records that are stored under the search domain name 372(2) "M.com. C2.com." Because the delegation record 180 is not installed under the search domain name 372(2), the DNS server 160 does not return the delegation record 180.

In this fashion, the record search engine 210 continues to generate search domain names 372 based on the domain search path 256 and the manufacturer domain name 242 until the record search engine 210 generates the search domain name 372(N) that matches the installation domain name 272. More specifically, the record search engine 210 composites the $N^{th}$ domain name "CN.com" that is included in the domain search path 256 with the manufacturer domain name 242 "M.com" to generate the search domain name 372(N) "M.com. CN.com." The record search engine 210 then transmits the DNS record query 365(N) to the DNS server 360. The DNS record query 365(N) causes the DNS server 160 to return any text records that are installed under the search domain name 372(N) "M.com. CN.com." Because the delegation record 180 is installed under the search domain name 372(N), the DNS server 160 locates the delegation record 180. Upon successfully verifying the customer DNSSEC signature 274 associated with the installed delegation record 170, the DNS server 160 returns the delegation record 180 to the record search engine 210. As detailed in FIG. 2, the verification engine 220 then attempts to verify the manufacturer signature 284 associated with the delegation record 180.

Figure 4:
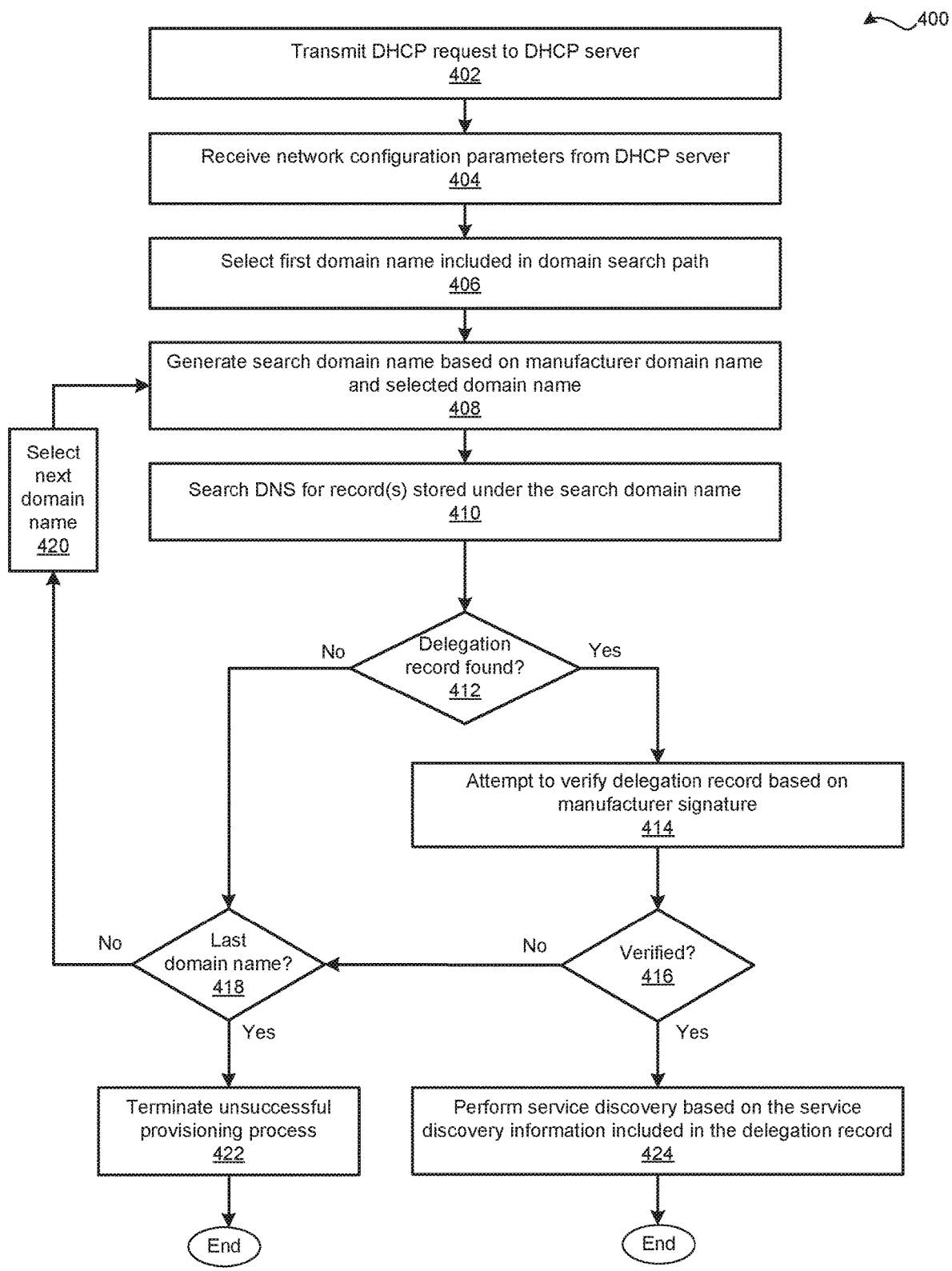
FIG. 4 is a flow diagram of method steps for securely provisioning an Internet of Things (IoT) device with configuration information to allow the IoT device to perform service discovery operations in a networked environment, according to various embodiments of the present invention.

FIG. 4 is a flow diagram of method steps for securely provisioning an Internet of Things (IoT) device with configuration information to allow the IoT device to perform service discovery operations in a networked environment, according to various embodiments of the present invention. Although the method steps are described with reference to the systems of FIGS. 1-3, persons skilled in the art will understand that any system configured to implement the method steps, in any order, falls within the scope of the present invention. The context of FIG. 4 is that the IoT device 105 is configured to include the manufacturer data 140 during the manufacturing process. Further, prior to receiving the IoT device 105, the customer signs and installs the delegation record 180 into the Domain Name System (DNS) to generate the installed delegation record 170. Notably, a single installed delegation record 170 enables the method steps for any number of the IoT devices 105 associated with both the manufacturer and the customer.

As shown, a method 400 begins at step 402, where the IoT device 105 boots and transmits a Dynamic Host Configuration Protocol (DHCP) request to the DHCP server 150 that is connected to the IoT device 105 through a network. The IoT device 105 may identify and communicate with the DHCP server 150 in any technically feasible fashion. At step 404, the IoT device 105 receives the network configuration parameters 250 from the DHCP server 150. Among other things, the network configuration parameters 250 includes the DNS server IP address 254 that identifies the DNS server 160 and the domain search path 256. The domain search path 256 may include any number of domain names.

Please note that, for purposes of discussion only, it is assumed that the delegation engine 130 included in the IoT device 105 initiates the security provisioning for the IoT device 105 when the IoT device 105 boots. In alternate embodiments, the delegation engine 130 may be configured to execute based on any stimuli in any technically feasible fashion.

At step 406, the record search engine 210 selects the first domain name included in the domain search path 256. At step 408, the record search engine 210 generates the search domain name 372 based on the manufacturer domain name 242 that is included in the IoT device 105 and the selected domain name. The record search engine 210 may implement any naming convention to generate the search domain name 372 that is consistent with the installed delegation record 170. For example, in some embodiments, the customer prefixes a domain name that is included in the domain search path 256 with the manufacturer domain name 242 to generate the installation domain name 272. The customer then stores the delegation record 180 in the DNS under the installation domain name 272 to generate the installed delegation record 170. In such embodiments, the record search engine 210 is configured to prefix the selected domain name with the manufacturer domain name 242 to generate the search domain name 372.

At step 410, the record search engine 210 searches the DNS for records stored under the search domain name 372. The record search engine 210 may search the DNS in any technically feasible fashion. For example, in some embodiments, the record search engine 210 may identify the DNS server 160 based on the DNS server IP address 254 included in the network configuration parameters 250. The record search engine 210 may then generate the DNS record query 365 that specifies the search domain name 372 and transmit the DNS record query 365 to the DNS server 160. If, at step 412, the record search engine 210 receives the delegation record 180 as a result of the DNS search, then the method 400 proceeds to step 414. As persons skilled in the art will recognize, if the search domain name 372 matches the installation domain name 272, then the DNS server 160 successfully locates the delegation record 180.

In some embodiments, the record search engine 210 and the DNS server 160 may implement DNS Security Extensions (DNSSEC) techniques to ensure that the delegation record 180 is associated with the installation domain name 272. While installing the delegation record 180 into the DNS, the delegation record 180 is signed to generate the DNSSEC signature 274 that is associated with the installed delegation record 170. The IoT device 150 requests DNSSEC functionality with each DNS query sent to the DNS server 160. When the IoT device 105 subsequently interacts with the DNSSEC-enabled DNS server 160 to perform the DNS search, DNSSEC processes verify that any resource records retrieved are associated with the search domain name 372 based on the DNSSEC signature 274. Consequently, if a false record were stored under the installation domain name 272, then the DNSSEC verification process would fail and the DNS server 160 would not return the false record to the record search engine 210. The DNS server 160 returns DNSSEC signatures in the DNS query response. The record search engine 210 of the IoT device 105 then performs the DNSSEC verification process, ignoring resource records that fail verification. Because the IoT device 105 performs the DNSSEC verification process, the IoT device 105 is protected from malicious or faulty DNS servers 160 that might return resource records when DNSSEC verification fails.

At step 414, the verification engine 220 attempts to verify the delegation record 180 based on the manufacturer signature 284 included in the delegation record 180. The verification engine 220 may implement any verification technique that is consistent with the manufacturer signature 284. For example, in some embodiments, the verification engine 220 may attempt to verify the delegation record 180 based on a Public Key Infrastructure (PKI). In such embodiments, the manufacturer generates the manufacturer signature 284 based on a private key that is included in a key pair that is associated with the manufacturer. During manufacturing, the manufacturer securely stores the public key information 244 that enables the IoT device 105 to identify the public key that is included in the key pair within the IoT device 105. As part of step 414, the delegation engine 130 identifies the public key based on the public key information 244 and then performs PKI-based authentication techniques to determine whether or not the delegation record 180 is trustworthy. At step 416, the delegation engine 130 determines whether the delegation engine 130 has found and verified the delegation record 180. If, at step 416, the delegation engine 130 determines that the record search engine 210 has not successfully retrieved the delegation record 180 or the verification engine 220 has not successfully verified the retrieved delegation record 180, then the method 400 proceeds to step 418.

If, however, at step 412, the record search engine 210 does not receive the delegation record 180 as a result of the DNS search, then the method 400 proceeds directly to step 418. At step 418, the record search engine 210 determines whether the selected domain name is the last domain name included in the domain search path 256. If, at step 418, the record search engine 210 determines that the selected domain name is not the last domain name included in the domain search path 256, then the method 400 proceeds to step 420. At step 420, the record search engine 210 selects the next domain name included in the domain search path 256 and the method 400 returns to step 408. The delegation engine 130 continues to cycle through steps 408-420, searching the DNS for the delegation record 180 based on different search domain names 372 until the delegation engine 130 finishes processing all the domain names included in the domain search path 256 or the delegation engine 130 successfully retrieves and verifies the delegation record 180. In alternate embodiments, the record search engine 120 may implement any technically feasible mechanisms for traversing the domain search path 256. For example, in some embodiments, the record search engine 120 may process the domain names included in the domain search path 256 in any order. Further, in some embodiments, the record search engine 120 may concurrently process multiple domain names included in the domain search path 256.

If, however, at step 418, the record search engine 210 determines that the selected domain name is the last domain name included in the domain search path 256, then the method 400 proceeds directly to step 422. At 422, the delegation engine 130 terminates the provisioning process without configuring the IoT device 105 to perform search discovery. In this fashion, the delegation engine 130 protects the IoT device 105 from rogue entities that may attempt to breach the security of the IoT device 105 during the provisioning process. Such rogue entities may include, without limitation, rogue DNS servers 160, rogue DHCP servers 150, rogue service providers 190, and so forth.

If, however, at step 416, the delegation engine 130 determines that the record search engine 210 has successfully retrieved the delegation record 180 and the verification engine 220 has successfully verified the delegation record 180, then the method 400 proceeds to step 424. At step 424, the configuration data engine 230 included in the delegation engine 130 performs read operations on the delegation record 180 to determine service discovery information. The service discovery information may include any type of information that enables the IoT device 105 to perform search discovery. The configuration data engine 230 then configures the IoT device 105 to perform search discovery based on the service discovery information and the method 400 terminates. The configuration data engine 230 may configure the IoT device 105 in any technically feasible fashion that is based on the service discovery information.

For example, in some embodiments the service discovery information may include the trusted domain name 282. The configuration data engine 230 may store the trusted domain name 282 in secure memory within the IoT device 105. The method 400 then terminates. Subsequently, the IoT device 105 may perform service discovery based on the Domain Name System protocol with the DNS service discovery (DNS-SD) standard and the trusted domain name 282. More specifically, the IoT device 105 may search the DNS 160 for service records that are stored under the trusted domain name 282. The service records identify the service providers 190. Based on the security measures implemented by the delegation engine 130 and the trusted entity associated with the trusted domain name 282, the service providers 190 are trustworthy.

Note that the techniques described herein are illustrative rather than restrictive, and may be altered without departing from the broader spirit and scope of the invention. For example, in various embodiments, any number of the techniques may be implemented while other techniques may be omitted in any technically feasible fashion to increase the overall security of the provisioning process. For example, in some embodiments, the delegation engine 130 and the DNS server 160 may not implement DNSSEC, and the installed delegation record 170 may not include the customer DNSSEC signature 274. Many such modifications and variations on the functionality provided by the delegation engine 130 will be apparent to those of ordinary skill in the art without departing from the scope and spirit of the described embodiments.

In sum, the disclosed techniques may be used to securely and automatically provision devices to identify and interact with external services. During device manufacturing, the manufacturer configures the devices to securely store a manufacturer domain name and information that identifies a public key included in a key pair that is associated with the manufacturer. Prior to providing devices to a given customer, the manufacturer generates a delegation record that includes a customer-specific trusted domain name for the purpose of service discovery. The manufacturer signs the delegation record using the private key included in the key pair that is associated with the manufacturer and delivers the delegation record to the customer. Upon receiving the delegation record, the customer generates an installation domain name based on the manufacturer domain name and a domain name that is included in a domain search path associated with the deployment environment. The customer then signs the delegation record based on DNS Security Extensions (DNSSEC) and stores the delegation record in the Domain Name System (DNS) under the installation domain name. The installed delegation record is applicable to any number of the devices received from the manufacturer.

Subsequently, as each device is booted in the deployment environment, a delegation engine included in the device retrieves the installed delegation record. More specifically, the device issues a Dynamic Host Configuration Protocol (DHCP) request that returns, among other things, a domain search path. The delegation engine then generates search domain name(s) based on the manufacturer domain name included in the device and a domain name included in the domain search path. The delegation engine searches the DNS for records based on the search domain name(s). If a search domain name matches the installation domain name and the DNS server successfully verifies the customer DNSSEC signature, then the DNS server transmits the delegation record to the delegation engine. The delegation engine then verifies the manufacturer signature based on the public key information included in the device. If the delegation engine determines that the delegation record is authentic, then the delegation engine configures the device to perform service discovery based on the trusted domain name included in the delegation record. By contrast, if the delegation engine is unable to successfully retrieve and verify a delegation record, then the delegation engine aborts the provisioning process.

Advantageously, the techniques described herein automate the provisioning to perform search discovery without exposing IoT devices to security risks. In particular, the time, cost, and overhead required to provision IoT devices based on delegation records is significant less than the time required to manually provision IoT devices. Further, once a particular customer has installed the delegation record in the DNS, the provisioning for each of the IoT devices is fully automated. Consequently, unlike manually-based provisioning techniques, the disclosed techniques scale effectively to accommodate the anticipated growth in the number of IoT devices going forward. In addition, because the delegation engine verifies the delegation record based on the manufacturer signature, the delegation engine protects the IoT device from any attempt by a malicious DNS server, a malicious DHCP server, or a malicious service provider to breach the security of the IoT device during the provisioning process.

1. In some embodiments, a method for provisioning a device with configuration information comprises generating a search domain name based on a first domain name associated with a manufacturer and stored in the device and a second domain name associated with a deployment environment; searching a Domain Name System (DNS) for a delegation record installed under the search domain name; verifying a manufacturer signature associated with the delegation record; and configuring the device based on service discovery information included in the delegation record to facilitate service discovery operations in the deployment environment.

2. The method of clause 1, wherein the service discovery information comprises a trusted domain name.

3. The method of clauses 1 or 2, wherein the manufacturer signature is generated using a private key, and verifying the manufacturer signature comprises determining a public key based on public key information stored in the device; and authenticating the manufacturer signature based on the public key.

4. The method of any of clauses 1-3, wherein determining the public key comprises searching, based on the public key information, the DNS for a Transport-Layer Security Authentication (TLSA) record that includes the public key.

5. The method of any of clauses 1-4, wherein generating the search domain name comprises compositing the first domain name and the second domain name.

6. The method of any of clauses 1-5, wherein searching the DNS for the delegation record comprises generating a DNS record query that includes the search domain name, and transmitting the DNS record query to a DNS server.

7. The method of any of clauses 1-6, wherein the delegation record is associated with a DNS Security Extensions (DNSSEC) signature that is generated based on DNSSEC, and the DNS server is configured to verify the DNSSEC signature.

8. The method of any of clauses 1-7, further comprising transmitting a Dynamic Host Configuration Protocol (DHCP) request to a DHCP server included in the deployment environment; receiving a response that includes a domain search path from the DHCP server; and setting the second domain name to a domain name included in the domain search path.

9. In some embodiments, a computer-readable storage medium includes instructions that, when executed by a processor, cause the processor to provision a device with configuration information by performing the steps of searching a Domain Name System (DNS) for a delegation record installed under a search domain name; performing one or more verification operations to authenticate the delegation record; and configuring the device based on service discovery information included in the delegation record to facilitate service discovery operations in a networked environment.

10. The computer-readable storage medium of clause 9, wherein the service discovery information comprises a trusted domain name.

11. The computer-readable storage medium of clauses 9 or 10, wherein a manufacturer signature is associated with the delegation record, the manufacturer signature is generated using a private key, and performing the one or more verification operations comprises determining a public key based on public key information stored in the device; and authenticating the manufacturer signature based on the public key.

12. The computer-readable storage medium of any of clauses 9-11, wherein determining the public key comprises searching, based on the public key information, the DNS for a Transport-Layer Security Authentication (TLSA) record that is associated with the public key.

13. The computer-readable storage medium of any of clauses 9-12, wherein searching the DNS for the delegation record comprises generating a DNS record query that includes the search domain name, and transmitting the DNS record query to a DNS server included in the networked environment.

14. The computer-readable storage medium of any of clauses 9-13, further comprising generating the search domain name based on a first domain name associated with a manufacturer and stored in the device and a second domain name associated with the networked environment.

15. The computer-readable storage medium of any of clauses 9-14, further comprising transmitting a Dynamic Host Configuration Protocol (DHCP) request to a DHCP server included in the networked environment; receiving a response that includes a domain search path from the DHCP server; and setting the second domain name to a domain name included in the domain search path.

16. The computer-readable storage medium of any of clauses 9-15, wherein the delegation record comprises a text record (TXT).

17. In some embodiments, a system comprises a memory storing a delegation engine and manufacturer data; and a processor that is coupled to the memory and, when executing the delegation engine, is configured to generate a search domain name based on a first domain name included in the manufacturer data and a second domain name associated with a deployment environment; search a Domain Name System (DNS) for a delegation record installed under the search domain name; verify a manufacturer signature associated with the delegation record; and configure a device based on service discovery information included in the delegation record to facilitate service discovery operations in the deployment environment.

18. The system of clause 17, wherein the service discovery information comprises a trusted domain name.

19. The system of clauses 17 or 18, wherein the delegation record comprises a text record (TXT).

20. The system of any of clauses 17-19, wherein the device comprises a computing device, a smart phone, a wearable technology device, an appliance, or a sensor.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semi-conductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, the method comprising:
   searching, by a device, a domain name system (DNS) for a record associated with a domain name, wherein the record comprises a transport layer security authentication (TLSA) record;
   obtaining, by the device, the record from the DNS, wherein the record is associated with a signature generated using a private key, and wherein the record enables retrieval of a public key that corresponds to the private key;
   authenticating, by the device, the signature associated with the record, wherein the authenticating is based on the public key; and
   configuring the device based on information included in the record,
   wherein the information included in the record comprises a trusted domain name that facilitates discovery of one or more services identified by an Internet of Things (IoT) device.

2. The computer-implemented method of claim 1, wherein searching the DNS for the record comprises:
   generating a DNS record query that includes the domain name; and
   transmitting the DNS record query to a DNS server.

3. The computer-implemented method of claim 2, wherein:
   the delegation record is associated with a DNS Security Extensions (DNSSEC) signature that is generated based on DNSSEC; and
   the DNS server is configured to verify the DNSSEC signature.

4. The computer-implemented method of claim 1, further comprising:
   transmitting a Dynamic Host Configuration Protocol (DHCP) request to a DHCP server; and
   receiving, from the DHCP server, a response that includes the domain name.

5. The computer-implemented method of claim 1, wherein a portion of the domain name is associated with a manufacturer of the device.

6. One or more non-transitory computer-readable storage media including instructions that, when executed by one or more processors, cause the one or more processors to perform steps comprising:
   searching, by a device, a Domain Name System (DNS) for a record associated with a domain name, wherein the record comprises a transport layer security authentication (TLSA) record;
   obtaining, by the device, the record from the DNS, wherein the record is associated with a signature generated using a private key, and wherein the record enables retrieval of a public key that corresponds to the private key;
   authenticating, by the device, the signature associated with the record, wherein the authenticating is based on the public key; and
   configuring the device based on information included in the record,
   wherein the information included in the record comprises a trusted domain name that facilitates discovery of one or more services identified by an Internet of Things (IoT) device.

7. The one or more non-transitory computer-readable storage media of claim 6, wherein searching the DNS for the record comprises:
   generating a DNS record query that includes the domain name; and
   transmitting the DNS record query to a DNS server.

8. The one or more non-transitory computer-readable storage media of claim 6, further comprising:
   transmitting a Dynamic Host Configuration Protocol (DHCP) request to a DHCP server; and
   receiving, from the DHCP server, a response that includes the domain name.

9. The one or more non-transitory computer-readable storage media of claim 6, wherein the record comprises a text record (TXT).

10. A system comprising:
    a memory storing an engine associated with a device; and
    a processor that is coupled to the memory and, when executing the engine, is configured to cause the engine to:
    search a Domain Name System (DNS) for a record associated with a domain name, wherein the record comprises a transport layer security authentication (TLSA) record;
    obtain the record from the DNS, wherein the record is associated with a signature generated using a private key, and wherein the record enables retrieval of a public key that corresponds to the private key;
    authenticate the signature associated with the record, wherein the authenticating is based on the public key; and
    configure the device based on information included in the record,
    wherein the information included in the record comprises a trusted domain name that facilitates discovery of one or more services identified by an Internet of Things (IoT) device.

11. The system of claim 10, wherein the record comprises a text record (TXT).

12. The system of claim 10, wherein the device comprises a computing device, a smart phone, a wearable technology device, an appliance, or a sensor.

\* \* \* \* \*